United States Patent Office 3,313,598
Patented Apr. 11, 1967

3,313,598
METHOD OF CONTROLLED HYDROGEN GENERATION
Martin E. Gluckstein, Farmington, Mich., assignor to Ethyl Corporation, New York, N.Y., a corporation of Virginia
No Drawing. Filed June 7, 1965, Ser. No. 462,123
4 Claims. (Cl. 23—211)

The present application is a continuation-in-part of application Ser. No. 179,485, filed March 13, 1962, and now abandoned.

This invention relates to a method of producing hydrogen. More particularly, it relates to a method of producing hydrogen from the controlled chemical reaction of sodium aluminum hydride with water.

For a variety of applications, it is often desirable to have a portable source of hydrogen. A relatively new use is the hydrogen-oxygen fuel cell wherein chemical energy is directly converted to electrical energy. In many applications, such fuel cells are to be used in the field away from a convenient supply of hydrogen.

For field use, hydrogen is obtained from a variety of sources including liquid hydrogen, bottled hydrogen and "wet chemical methods" involving a chemical reaction as the source. Both liquid and bottled hydrogen are transported under extremely high pressures and thus require the use of high-pressure vessels. With liquid hydrogen, insulation and/or refrigeration is commonly used. The disadvantage is obvious, and in applications wherein weight and bulk are at a priority, the use of bottled or liquid hydrogen is precluded.

The wet chemical method has been previously used to supply hydrogen for various applications. Thus, the reaction of hydrides such as sodium borohydride or calcium hydride with water to generate hydrogen has been previously suggested. However, these reactions have certain disadvantages which have prevented their wide-spread use. Problems encountered are that many of the reactions are too slow or too fast and tend to produce explosions, or require a specific catalyst. Oftentimes, the reaction products tend to adhere to the reaction surface, thereby slowing or totally stopping the reaction. Also, many of the hydrides are prohibitively expensive.

It is an object of this invention to provide a method for the generation of hydrogen. Another object is to provide a method of generating hydrogen which may be easily and safely carried out in light, portable equipment. Another object is to provide a method for the controlled generation of hydrogen at any desired pressure level.

These and other objects are accomplished by the method of this invention, which in its broad aspect comprises reacting a liquid reactant comprising a major proportion of a liquid selected from the group consisting of water and lower aliphatic alcohols and mixtures of these reactants with sodium aluminum hydride in a reaction zone thereby generating hydrogen, and removing said hydrogen from said reaction zone.

The alcohols useable in this invention are the lower aliphatic alcohols containing up to about 4 carbon atoms. In many respects the use of water in the above method produces superior results, and therefore, constitutes a preferred embodiment of this invention.

In the reaction of sodium aluminum hydride with water, 4 moles of hydrogen are obtained for each mole of hydride reacted. Half of this hydrogen comes wrom the compound and half from the water. The initial reaction is believed to be $$NaAlH_4 + 2H_2O \rightarrow NaAlO_2 + 4H_2$$

The sodium aluminate so formed further reacts with water:

$$NaAlO_2 + 2H_2O \rightarrow NaOH + Al(OH)_3$$

The heat of reaction for the overall reaction is 1460 calories/gram of hydride reacted. The reaction of sodium aluminum hydride with water proceeds at a smooth rate and is not susceptible to objectionable foaming as is the case in the reaction with some other hydrides. The initial reaction product is soluble in water which thus prevents the hydride from being coated with a non-reactive film.

The method of this invention is especially adapted for use in the field as a source of hydrogen. Sodium aluminum hydride in its commercial form is a crystalline powder of high purity and stability. Under pressure, the material may be compacted in a die to form coherent, durable pellets with a density of about 0.82. This material is non-reactive in dry air.

For field use, the present method of obtaining hydrogen has a large advantage over bottled hydrogen in both weight and volume. The advantage is still greater if water is available locally. A conventional cylinder of hydrogen currently used in commerce containing one pound of gas at 2,000 p.s.i. weighs 137 pounds, occupies 1.9 cubic feet of space, and cannot be economically discarded when empty. By comparison, one pound of hydrogen can be provided by a disposable canister of sodium aluminum hydride weighing less than 7.5 pounds and occupying about 0.14 cubic feet.

The method of this invention can be carried out under a variety of conditions. Temperature effects are relatively small and the reaction, carried out with water near its boiling point, while proceeding at a faster rate, is non-explosive. Sodium aluminum hydride reacts with water containing a freezing point depressant at temperatures far below 0° C. The reaction has been carried out with ice at temperatures as low as −75° C. However, in most applications, it is preferable to carry out the reaction at temperatures of from about zero to about +75° C.

The reaction may be carried out over a wide pressure range. The formation of hydrogen is favored at sub-atmospheric pressures but this many require a vacuum source which would add to the bulk of the equipment. One feature of this invention is that the reaction is self-pressurizing and can be used as a source of high-pressure hydrogen.

In practical applications, especially in field use, the bulk and weight of the required high-pressure equipment must be considered. Therefore, in most situations, it is preferred to carry out the reaction at pressures from about one to about 50 atmospheres.

In its commercial form, sodium aluminum hydride is a crystalline powder. To meet the requirements of sepcific applications, the material can also be in the form of coarse granules or may be compacted into small pellets of from about ⅛ to ¾ inches or into larger shaped forms such as cylindrical cartridges. The powder and granular form are preferred where maximum surface area is desired, whereas pellets and larger shaped forms are preferred where the rate of hydrogen generation is to be more closely controlled.

Of the various fluids investigated, it has been found that the rate of reaction is maximum when water is used as the liquid reactant. At room temperature, sodium aluminum hydride reacts with water to evolve about 0.018 liter of hydrogen/sec./cm.² of sodium aluminum hydride exposed. Other materials such as freezing point depressants may be added to the water reactant. These include lower alcohols, such as methyl, ethyl, propyl or butyl alcohol; glycols such as ethylene and propylene glycol; salts such as sodium chloride, calcium chloride, ammonium nitrate, sodium nitrate, etc. and various acids and bases.

The above-described materials may also be added to water to alter the rate of the reaction. For example, under room conditions, it has been found that using a 35 percent sulfuric acid solution, generation of hydrogen is reduced to a rate of about $3.3 \times 10^{-5}$ liters/sec./cm.$^2$ which is about 1/500 of the rate when using pure water. Using a 40 percent methanol solution, 0.011 liter of hydrogen/sec./cm.$^2$ was generated which is about 63 percent of the rate when using pure water.

The present process may be batch or continuous. For applications wherein a fast unrestrained source of hydrogen is required, either of the reactants may be introduced into an enclosed vessel containing the other reactant. Hydrogen is taken off through an appropriate exit line. Considering that water is required to dissolve or fluidize the solid products formed from the hydrolysis reaction, a minimum of approximately 3.5 grams of water per gram of sodium aluminum hydride are required for a smooth, complete reaction. To insure a continuous and complete reaction, it is desirable to have a somewhat larger amount of water than this. Accordingly, one of the preferred embodiments of this invention comprises contacting water with sodium aluminum hydride in a reaction zone thereby generating hydrogen, the ratio of water to sodium aluminum hydride ranging from about 4:1 to about 8:1 grams of water per gram of sodium aluminum hydride.

One of the main features of the method is that it can be used to continually provide hydrogen at any desired pressure for long durations. Thus, in a continuous process, either reactant may be fed into an enclosed chamber containing the other reactant, or both the water and the hydride may be simultaneously fed into the vessel. Since the reaction produces 4 moles of gaseous product per mole of hydride reacted, the reaction is self-pressurizing. By continually controlling the feed rate of either reactant, the reaction may be controlled so as to yield hydrogen at an essentially constant pressure at any desired level. The rate of feed may be controlled manually, or self-regulating equipment may be utilized. Accordingly, another preferred embodiment of this invention comprises a method for the continuous production of hydrogen comprising reacting sodium aluminum hydride with water in a reaction vessel to generate hydrogen, at least one of said reactants being fed into said reaction zone in a controlled manner so as to obtain a given quantity of hydrogen per unit time, and removing said hydrogen from said reaction zone. In the above method, either or both reactants may be continually fed into the reaction zone. Thus, the contact area between the two reactants may be controlled to generate the desired amount of hydrogen per unit time. By incorporating appropriate pressure regulators into the system, hydrogen can be obtained at any desired pressure, preferably in the range of from about one to 50 atmospheres.

The following examples demonstrate the process of this invention, but in no way are intended to limit its scope.

EXAMPLE I

Approximately 0.5 grams of sodium aluminum hydride was placed in a ½ inch diameter cylinder and compacted to form a coherent pellet with one exposed surface. The cylinder was placed in an enclosed chamber at essentially atmospheric pressure, and 5 milliliters of water at room temperature were admitted into the cylinder so as to contact the exposed surface of the hydride. Hydrogen was evolved at an average, steady rate of 0.018 liter sec./cm.$^2$ of exposed sodium aluminum hydride.

EXAMPLE II

The procedure of Example I was repeated but an aqueous solution of 35 percent sulfuric acid was substituted for the water. The steady rate of hydrogen generation was $3.3 \times 10^{-5}$ liters/sec./cm.$^2$. This is 1/530 times as fast as the reaction with pure water.

EXAMPLE III

The procedure of Example I was repeated but a 5 percent sodium chloride solution was substituted for the water. The rate of hydrogen generation was 0.013 liters/sec./cm.$^2$ of hydride surface.

EXAMPLE IV

The procedure of Example I was followed, but various water-methanol solutions were used in place of the pure water. The rates of hydrogen generation are shown in Table I.

Table I.—$H_2$ from $NaAlH_4$

| Weight percent methanol in water: | Steady state rate of hydrogen generation, liters/sec./cm.$^2$ |
|---|---|
| 0 | 0.018 |
| 40 | 0.011 |
| 60 | 0.009 |
| 70 | 0.00083 |
| 80 | 0.000015 |
| 90 | 0.000015 |
| 95 | 0.0119 |
| 100 | 0.015 |

The above data show that methanol-water solutions provide an excellent method of varying the rate of hydrogen generation. Increasing the methanol concentration up to about 80 percent progressively reduces the reaction rate. At concentrations of from 80 to 90 percent methanol, a minimum reaction rate is encountered, and any further increase in methanol concentration above 90 percent increases the rate of reaction until a value of about 0.015 liter/sec./cm.$^2$ is obtained with pure methanol. Another reason for using water-methanol solutions is to obtain a liquid reactant with a lower freezing point than pure water. In some applications carried out under extremely cold conditions, it is desirable to use pure methanol as the liquid reactant.

EXAMPLE V

To determine the minimum amount of fluid for complete reaction with sodium aluminum hydride, the following tests were carried out: A weighed pellet of sodium aluminum hydride was placed in an enclosed vessel and the reaction fluid at room temperature was admitted drop by drop from a buret until all the sodium aluminum hydride had reacted. To insure that none of the fluid vaporized due to the heat of reaction, the vessel was cooled. The results obtained with some of the fluids investigated are shown in Table II.

Table II.—Quantity of various fluids required for complete reaction with sodium aluminum hydride

| Reaction fluid, composition, wt. percent: | Ratio, grams fluid/gram $NaAlH_4$ |
|---|---|
| 100 Water | 3.48 |
| 100 methanol | 4.33 |
| 100 ethanol | 5.58 |
| 100 isopropanol | 11.95 |
| 35 sulfuric acid 10 acetic acid. 55 water. | 11.3 |
| 60 ethylene glycol 40 water. | 12.3 |
| 50 methanol 50 water. | 5.03 |
| 40 methanol 40 water. 20 sodium hydroxide. | 7.2 |

It is seen from Table II that water is superior to any other fluid tested with respect to the minimum amount of fluid required to completely react with a given amount of sodium aluminum hydride. In addition, water was superior in that it required essentially no stirring whereas many of the other fluids required continuous stirring and in some cases, the products of the reaction congealed to form a spongy mass.

EXAMPLE VI

Forty-six grams of sodium aluminum hydride, compacted into a ⅞ inch diameter cylinder, approximately 5½ inches long was suspended in the reaction chamber of a self-regulating gas generating apparatus. The apparatus is self-regulating in that pressures within the system are used to continually force the liquid reactant into and out of the reaction chamber thereby increasing, decreasing or totally stopping the reaction. Thus, if the generation of the gaseous product per unit time is too slow, additional fluid is forced into the reaction chamber so as to contact a greater area of the solid reactant, thereby increasing the quantity of the reaction. As pressures within the recation chamber build up to an excessive level, the pressure forces the liquid away from the solid reactant, thereby diminishing or totally stopping the reaction. The above-described cycle is then continually repeated. A pressure regulator is incorporated into the system whereby a gaseous product can be obtained at a constant pressure at any given pressure level.

Using the above-described apparatus, the pressure regulator was set to deliver hydrogen at a pressure of 30 p.s.i.g. The reaction was continued for 14 hours during which time hydrogen was obtained from an exit line at a steady rate of 0.003 ft.$^3$/minute.

The methods of preparing sodium aluminum hydride are well known to those skilled in the art. See for example U.S. Patents 2,567,972; 2,900,224; and 2,867,499.

I claim:

1. A method of generating hydrogen at a controlled variable rate less than that resulting from the treatment of sodium aluminum hydride with water, said method comprising reacting sodium aluminum hydride with aqueous methanol having a concentration within the range of from 40 to 90 weight percent methanol.

2. The method of claim 1 wherein said methanol concentration is from 70 to 90 weight percent.

3. A method of generating hydrogen at a controlled variable rate less than that resulting from the treatment of sodium aluminum hydride with water, said method comprising reacting sodium aluminum hydride with aqueous methanol having a concentration within the range of from 40 to 80 weight percent methanol, the rate of hydrogen generation progressively decreasing as the methanol concentration increases.

4. A method of generating hydrogen at a controlled variable rate less than that resulting from the treatment of sodium aluminum hydride with water, said method comprising reacting sodium aluminum hydride with an aqueous solution of 35 weight percent sulfuric acid.

References Cited by the Examiner
UNITED STATES PATENTS

| 2,625,556 | 1/1953 | Ott et al. | 23—211 X |
| 3,098,706 | 7/1963 | Blitzer et al. | 23—14 |
| 3,166,514 | 1/1965 | Parshall | 23—14 |
| 3,222,122 | 12/1965 | Johnson et al. | 23—14 |

OTHER REFERENCES

Finholt et al. (I) May 1947, J.A.C.S., page 1201.

Finholt et al. (II), J. Inorg. and Nuclear Chem., 1955, Vol. 1, pages 320 and 323.

Gaylord book "Reduction with Complex Metal Hydrides," pages 100 and 1018, 1956 Edition Interscience Publishers, Inc., N.Y.

Gaylord, "Reduction With Complex Hydrides," page 32.

Hurd, "Chemistry of the Hydrides" (1952), pages 32 and 167, published by John Wiley and Sons, Inc., New York.

OSCAR R. VERTIZ, *Primary Examiner.*

MAURICE A. BRINDISI, *Examiner.*

B. H. LEVENSON, E. STERN, *Assistant Examiners.*